(12) United States Patent
Sugamura

(10) Patent No.: US 8,049,641 B2
(45) Date of Patent: Nov. 1, 2011

(54) INDICATOR UNIT AND TELEVISION SET

(75) Inventor: Tomokazu Sugamura, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 243 days.

(21) Appl. No.: 12/179,420

(22) Filed: Jul. 24, 2008

(65) Prior Publication Data

US 2009/0027224 A1 Jan. 29, 2009

(30) Foreign Application Priority Data

Jul. 25, 2007 (JP) ................................ 2007-192836

(51) Int. Cl.
G08B 5/22 (2006.01)
(52) U.S. Cl. .................... 340/815.45; 362/310; 348/552
(58) Field of Classification Search .................. 362/310; 340/815.45; 348/552
See application file for complete search history.

(56) References Cited

U.S. PATENT DOCUMENTS

| | | | | |
|---|---|---|---|---|
| 3,611,359 | A | * | 10/1971 | Panerai et al. ........... 340/815.43 |
| 3,878,399 | A | * | 4/1975 | Higuchi et al. ............... 385/115 |
| 4,214,391 | A | | 7/1980 | Angst |
| 5,097,396 | A | * | 3/1992 | Myers ........................... 362/551 |
| 5,307,245 | A | * | 4/1994 | Myers et al. .................. 362/554 |
| 5,774,608 | A | * | 6/1998 | Allen et al. ...................... 385/39 |
| 5,978,088 | A | * | 11/1999 | Ventura ......................... 356/600 |
| 6,097,302 | A | * | 8/2000 | Zinzell ..................... 340/815.44 |
| 2006/0164839 | A1 | | 7/2006 | Stefanov |

FOREIGN PATENT DOCUMENTS

| | | |
|---|---|---|
| DE | 10 2005 042 523 A1 | 12/2006 |
| EP | 1 684 002 A2 | 7/2006 |
| GB | 2 324 364 A | 10/1998 |
| JP | 59-60684 U | 4/1984 |
| JP | 1-169295 U | 11/1989 |
| JP | 9-127886 A | 5/1997 |
| JP | 10-49066 A | 2/1998 |
| JP | 2006-4055 A | 1/2005 |
| JP | 2005-327548 A | 11/2005 |
| JP | 2005-331870 A | 12/2005 |
| JP | 2007-58928 A | 3/2007 |

OTHER PUBLICATIONS

Extended European Search Report dated Apr. 16, 2009 (Five (5) pages).
Japanese Office Action dated Aug. 18, 2009 including English translation (Five (5) pages).
Japanese Office Action dated Nov. 10, 2009 including English translation (Four (4) pages).

* cited by examiner

*Primary Examiner* — Eric M Blount
(74) *Attorney, Agent, or Firm* — Crowell & Moring LLP

(57) ABSTRACT

This indicator unit includes a light source portion and a lens member including a first reflecting portion reflecting light received from the light source portion in a prescribed direction, a second reflecting portion reflecting the light reflected by the first reflecting portion and light received from the light source portion in a front direction intersecting with the prescribed direction and a display portion displaying the light reflected by the second reflecting portion in the front direction. The light source portion is so arranged that the anteroposterior position thereof overlaps the second reflecting portion.

20 Claims, 9 Drawing Sheets

INDICATOR UNIT AND TELEVISION SET

BACKGROUND OF THE INVENTION

1. Field of the Invention

The present invention relates to an indicator unit and a television set, and more particularly, it relates to an indicator unit comprising a light source portion and a display portion and a television set comprising a disk unit including this indicator unit.

2. Description of the Background Art

An indicator unit comprising a light source portion and a display portion is known in general, as disclosed in each of Japanese Patent Laying-Open Nos. 2005-4055, 2005-327548 and 9-127886 (1997), for example.

The aforementioned Japanese Patent Laying-Open No. 2005-4055 discloses a light-emitting diode display (indicator unit) comprising a light-emitting diode (light source portion) and a display portion. In this light-emitting diode display, a sacrificial board having a plurality of openings is arranged between the display portion and the light-emitting diode, in order to enlarge a region of the display portion irradiated with light from the light-emitting diode. The light from the light-emitting diode progresses toward the display portion while causing interference when transmitted through the openings, whereby the region of the display portion irradiated with the light can be enlarged.

The aforementioned Japanese Patent Laying-Open No. 2005-327548 discloses an indicator unit comprising a light-emitting diode (light source portion) and an LED lens including a display portion. In this indicator unit, the light-emitting diode is arranged on a position separating from the display portion in both of the depth direction of the indicator unit and a direction orthogonal to the depth direction. A photoreceiving portion so obliquely formed as to extend in the depth direction and the direction orthogonal to the depth direction from a portion around the front side (display direction) of the light-emitting diode toward the display portion is provided between the light-emitting diode and the display portion. This photoreceiving portion includes a fine corrugated shape on the surface closer to the light-emitting diode. Thus, light emitted from the light-emitting diode progresses toward the display portion in a diffusedly reflected state when transmitted through the photoreceiving portion, whereby a region of the display portion irradiated with the light can be enlarged.

The aforementioned Japanese Patent Laying-Open No. 9-127886 discloses an indicator unit comprising an LED (light source portion) and a display window (display portion). In this indicator unit, an LED lens is arranged between the LED and the display window, in order to enlarge a region of the display window irradiated with light from the LED. In this LED lens, a semicylindrical photoreceiving portion convexly bent with respect to the LED is provided on the side closer to the LED, and a light-emitting portion having a serrated surface is provided on the side closer to the display window. According to this structure, the light from the LED progresses toward the display window while diffusedly reflected when transmitted through the LED lens, whereby the region of the display window irradiated with the light can be enlarged.

In the light-emitting diode display described in the aforementioned Japanese Patent Laying-Open No. 2005-4055, however, the sacrificial board including the plurality of openings must be provided between the light-emitting diode and the display portion in order to enlarge the region of the display portion irradiated with the light from the light-emitting diode, while a prescribed depth is required in order to enlarge the region of the display portion irradiated with the light from the light-emitting diode causing interference. Therefore, the depth of the light-emitting diode display must disadvantageously be increased.

In the indicator unit described in the aforementioned Japanese Patent Laying-Open No. 2005-327548, the LED lens including the display portion and the photoreceiving portion is provided in order to enlarge the region of the display portion irradiated with the light from the light-emitting diode (LED), and the LED is arranged on the position separating from this LED lens in the depth direction. Therefore, the indicating unit has a depth corresponding to the sum of the depths of at least the LED lens and the LED, and hence the size of the indicator unit must disadvantageously be increased in the depth direction.

In the indicator unit described in the aforementioned Japanese Patent Laying-Open No. 9-127886, the LED lens including the semicylindrical photoreceiving portion and the light-emitting portion having the serrated surface must be arranged between the LED and the display window in order to enlarge the region of the display window irradiated with the light from the LED, and hence the distance between the LED and the display window is increased. Therefore, the depth of the indicator unit must disadvantageously be increased.

SUMMARY OF THE INVENTION

The present invention has been proposed in order to solve the aforementioned problems, and an object of the present invention is to provide an indicator unit capable of suppressing increase in the depth thereof while enlarging a region of a display portion irradiated with light from a light source portion.

An indicator unit according to a first aspect of the present invention comprises a light source portion and a lens member including a first reflecting portion reflecting light received from the light source portion in a prescribed direction, a second reflecting portion reflecting the light reflected by the first reflecting portion and light directly received from the light source portion in a front direction intersecting with the prescribed direction and a display portion displaying the light reflected by the second reflecting portion in the front direction, while the light source portion is so arranged that the anteroposterior position thereof overlaps at least the second reflecting portion.

As hereinabove described, the indicator unit according to the first aspect comprises the lens member including the first reflecting portion reflecting the light in the prescribed direction, the second reflecting portion reflecting the light in the front direction intersecting with the prescribed direction and the display portion displaying the light reflected by the second reflecting portion so that the light from the light source portion is reflected by the first reflecting portion to progress in the prescribed direction, thereafter reflected by the second reflecting portion to progress in the front direction intersecting with the prescribed direction and displayed on the display portion, whereby the light emitted from the light source portion progresses from the light source portion up to the display portion by the total distance in the prescribed direction and the front direction. Thus, the light emitted from the light source portion is enlarged before reaching the display portion, whereby the region of the display portion irradiated with the light from the light source portion can be enlarged. Further, the light source portion is so arranged that the anteroposterior position thereof overlaps the second reflecting portion partially forming the lens member while the light from the light source portion is reflected by the second reflecting portion in the front direction intersecting with the prescribed direction and displayed on the display portion so that the depth-directional length of the indicator unit can be reduced due to the anteroposterior overlap of the light source portion and the second reflecting portion of the lens member, whereby the depth-directional length of the indicator unit can be inhibited from increase. Consequently, the depth of the indicator unit can be inhibited from increase while enlarging the region of the display portion irradiated with the light from the light source portion.

In the aforementioned indicator unit according to the first aspect, the lens member preferably further includes a first portion, including the first reflecting portion, extending in the prescribed direction and a second portion extending from the first portion in the front direction and including the display portion on the front end surface thereof, and the second reflecting portion is preferably constituted of a first inclined portion provided on an outer surface around the boundary between the first portion and the second portion. According to this structure, the second reflecting portion is provided on the rear end of the second portion with respect to the display portion provided on the front end surface of the second portion, whereby the light from the light source portion reflected by the second reflecting portion is transmitted substantially through the overall length of the second portion in the front direction to progress. Thus, the region irradiated with the light displayed on the display portion can be efficiently enlarged.

In this case, the first portion of the lens member is preferably W-shaped in front elevational view, a light source arrangement portion for arranging the light source portion is preferably provided on a recessed portion at the width-directional center of the W-shaped first portion, and a second inclined portion constituting the first reflecting portion reflecting light from the light source arrangement portion in the prescribed direction and extending obliquely outward is preferably provided on the outer side surface of the W-shaped first portion. According to this structure, the light from the light source arrangement portion arranged on the recessed portion at the width-directional center of the first portion is reflected upward with a prescribed spread by the obliquely outwardly extending second inclined portion of the first reflecting portion when reflected by the first reflecting portion having the second inclined portion. Thus, the region irradiated with the light can be enlarged by the light reflected not only by the second reflecting portion but also by the first reflecting portion, whereby the region irradiated with the light displayed on the display portion can be more efficiently enlarged.

In the aforementioned indicator unit having the W-shaped first portion, the light source portion is preferably constituted of a single light-emitting diode arranged on the light source arrangement portion at the width-directional center of the W-shaped first portion, and the second inclined portions constituting the first reflecting portion are preferably provided on both outer side surfaces of the W-shaped first portion to hold the single light-emitting diode therebetween. According to this structure, the light can be reflected upward at a prescribed spreading angle by two first reflecting portions with the single light-emitting diode, whereby the region irradiated with the light displayed on the display portion can be more effectively enlarged also when the single light-emitting diode is employed.

In the aforementioned indicator unit according to the first aspect, the first reflecting portion of the lens member preferably has a stepped shape, and the light is preferably so displayed on the display portion as to reflect the stepped shape. According to this structure, the light from the light source portion is reflected by the respective ones of a plurality of step portions provided on the first reflecting portion, whereby light spots can be displayed on the display portion by the number of the step portions provided on the first reflecting portion.

In the aforementioned indicator unit according to the first aspect, the lens member is preferably made of translucent resin. Thus, the lens member is so translucently formed that the light from the light source portion can be easily transmitted through the lens member. Further, the lens member is so made of the resin that the same can be easily formed by resin molding also into a complicated shape.

In the aforementioned indicator unit according to the first aspect, the lens member preferably further includes a first portion, including the first reflecting portion, extending in the prescribed direction and a second portion extending from the first portion in the front direction and having the display portion on the front end surface thereof, and the first portion and the second portion of the lens member are preferably integrally formed. According to this structure, the number of components can be reduced as compared with a case of providing the first and second portions of the lens member separately from each other.

The aforementioned indicator unit provided with the lens member including the first portion having the first reflecting portion preferably further comprises a wiring board mounted with the light source portion, and the light source portion is preferably so mounted as to protrude from the wiring board frontward, and so arranged as to at least partially overlap the first portion of the lens member in the anteroposterior direction. According to this structure, the light source portion and the first portion of the lens member can be easily arranged to overlap each other in the anteroposterior direction, whereby the depth-directional length of the indicator unit can be further reduced due to the anteroposterior overlap of the light source portion and the first portion of the lens member.

In the aforementioned indicator unit provided with the lens member having the W-shaped first portion and the light source arrangement portion, the light source portion is preferably so arranged on the light source arrangement portion as to vertically overlap the first portion of the lens member. According to this structure, the light emitted from the light source portion in the width direction can be reflected in the prescribed direction by the first reflecting portion of the first portion. Thus, the light emitted from the light source portion can be efficiently directed toward the display portion.

In the aforementioned indicator unit provided with the lens member having the stepped first reflecting portion, the stepped first reflecting portion of the lens member may include a first step portion extending along the prescribed direction and a second step portion extending along the width direction, and may have a stairlike shape obtained by alternately forming the first step portion and the second step portion.

A television set according to a second aspect of the present invention integrally comprises a disk unit, the disk unit includes an indicator unit, and the indicator unit includes a light source portion and a lens member including a first reflecting portion reflecting light received from the light source portion in a prescribed direction, a second reflecting portion reflecting the light reflected by the first reflecting portion and light directly received from the light source portion in a front direction intersecting with the prescribed direction and a display portion displaying the light reflected by the second reflecting portion in the front direction, while the light source portion is so arranged that the anteroposterior position thereof overlaps at least the second reflecting portion.

As hereinabove described, the indicator unit of the television set according to the second aspect includes the lens member including the first reflecting portion reflecting the light in the prescribed direction, the second reflecting portion reflecting the light in the front direction intersecting with the prescribed direction and the display portion displaying the light reflected by the second reflecting portion so that the light from the light source portion is reflected by the first reflecting portion to progress in the prescribed direction, thereafter reflected by the second reflecting portion to progress in the front direction intersecting with the prescribed direction and displayed on the display portion, whereby the light emitted from the light source portion progresses from the light source portion up to the display portion by the total distance in the prescribed direction and the front direction. Thus, the light emitted from the light source portion is enlarged before reaching the display portion, whereby the region of the display portion irradiated with the light from the light source portion can be enlarged. Further, the light source portion is so arranged that the anteroposterior position thereof overlaps the second reflecting portion partially forming the lens member while the light from the light source portion is reflected by the second reflecting portion in the front direction intersecting with the prescribed direction and displayed on the display portion so that the depth-directional length of the indicator unit can be reduced due to the anteroposterior overlap of the light source portion and the second reflecting portion of the lens member, whereby the depth-directional length of the indicator unit can be inhibited from increase. Consequently, the depth of the indicator unit can be inhibited from increase while enlarging the region of the display portion irradiated with the light from the light source portion.

In the aforementioned television set according to the second aspect, the lens member preferably further includes a first portion, including the first reflecting portion, extending in the prescribed direction and a second portion extending from the first portion in the front direction and including the display portion on the front end surface thereof, and the second reflecting portion is preferably constituted of a first inclined portion provided on an outer surface around the boundary between the first portion and the second portion. According to this structure, the second reflecting portion is provided on the rear end of the second portion with respect to the display portion provided on the front end surface of the second portion, whereby the light from the light source portion reflected by the second reflecting portion is transmitted substantially through the overall length of the second portion in the front direction to progress. Thus, the region irradiated with the light displayed on the display portion can be efficiently enlarged.

In this case, the first portion of the lens member is preferably W-shaped in front elevational view, a light source arrangement portion for arranging the light source portion is preferably provided on a recessed portion at the width-directional center of the W-shaped first portion, and a second inclined portion constituting the first reflecting portion reflecting light from the light source arrangement portion in the prescribed direction and extending obliquely outward is preferably provided on the outer side surface of the W-shaped first portion. According to this structure, the light from the light source arrangement portion arranged on the recessed portion at the width-directional center of the first portion is reflected upward with a prescribed spread by the obliquely outwardly extending second inclined portion of the first reflecting portion when reflected by the first reflecting portion having the second inclined portion. Thus, the region irradiated with the light can be enlarged by the light reflected not only by the second reflecting portion but also by the first reflecting portion, whereby the region irradiated with the light displayed on the display portion can be more efficiently enlarged.

In the aforementioned television set comprising the indicator unit having the W-shaped first portion, the light source portion is preferably constituted of a single light-emitting diode arranged on the light source arrangement portion at the width-directional center of the W-shaped first portion, and the second inclined portions constituting the first reflecting portion are preferably provided on both outer side surfaces of the W-shaped first portion to hold the single light-emitting diode therebetween. According to this structure, the light can be reflected upward at a prescribed spreading angle by two first reflecting portions with the single light-emitting diode, whereby the region irradiated with the light displayed on the display portion can be more effectively enlarged also when the single light-emitting diode is employed.

In the aforementioned television set according to the second aspect, the first reflecting portion of the lens member preferably has a stepped shape, and the light is preferably so displayed on the display portion as to reflect the stepped shape. According to this structure, the light from the light source portion is reflected by the respective ones of a plurality of step portions provided on the first reflecting portion, whereby light spots can be displayed on the display portion by the number of the step portions provided on the first reflecting portion.

In the aforementioned television set according to the second aspect, the lens member is preferably made of translucent resin. Thus, the lens member is so translucently formed that the light from the light source portion can be easily transmitted through the lens member. Further, the lens member is so made of the resin that the same can be easily formed by resin molding also into a complicated shape.

In the aforementioned television set according to the second aspect, the lens member preferably further includes a first portion, including the first reflecting portion, extending in the prescribed direction and a second portion extending from the first portion in the front direction and having the display portion on the front end surface thereof, and the first portion and the second portion of the lens member are preferably integrally formed. According to this structure, the number of components can be reduced as compared with a case of providing the first and second portions of the lens member separately from each other.

The aforementioned television set comprising the indicator unit provided with the lens member including the first portion having the first reflecting portion preferably further comprises a wiring board mounted with the light source portion, and the light source portion is preferably so mounted as to protrude from the wiring board frontward, and so arranged as to at least partially overlap the first portion of the lens member in the anteroposterior direction. According to this structure, the light source portion and the first portion of the lens member can be easily arranged to overlap each other in the anteroposterior direction, whereby the depth-directional length of the indicator unit can be further reduced due to the anteroposterior overlap of the light source portion and the first portion of the lens member.

In the aforementioned television set comprising the indicator unit provided with the lens member having the W-shaped first portion and the light source arrangement portion, the light source portion is preferably so arranged on the light source arrangement portion as to vertically overlap the first portion of the lens member. According to this structure, the light emitted from the light source portion in the width direction can be reflected in the prescribed direction by the first reflecting portion of the first portion. Thus, the light emitted from the light source portion can be efficiently directed toward the display portion.

In the aforementioned television set comprising the indicator unit provided with the lens member having the stepped first reflecting portion, the stepped first reflecting portion of the lens member may include a first step portion extending along the prescribed direction and a second step portion extending along the width direction, and may have a stairlike shape obtained by alternately forming the first step portion and the second step portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a television set 1 with a disk unit comprising an indicator unit 10 according to an embodiment of the present invention is described with reference to FIG. 1 to 10. This embodiment of the present invention is applied to the television set 1 with a disk unit employed as an exemplary television set.

Figure 1:
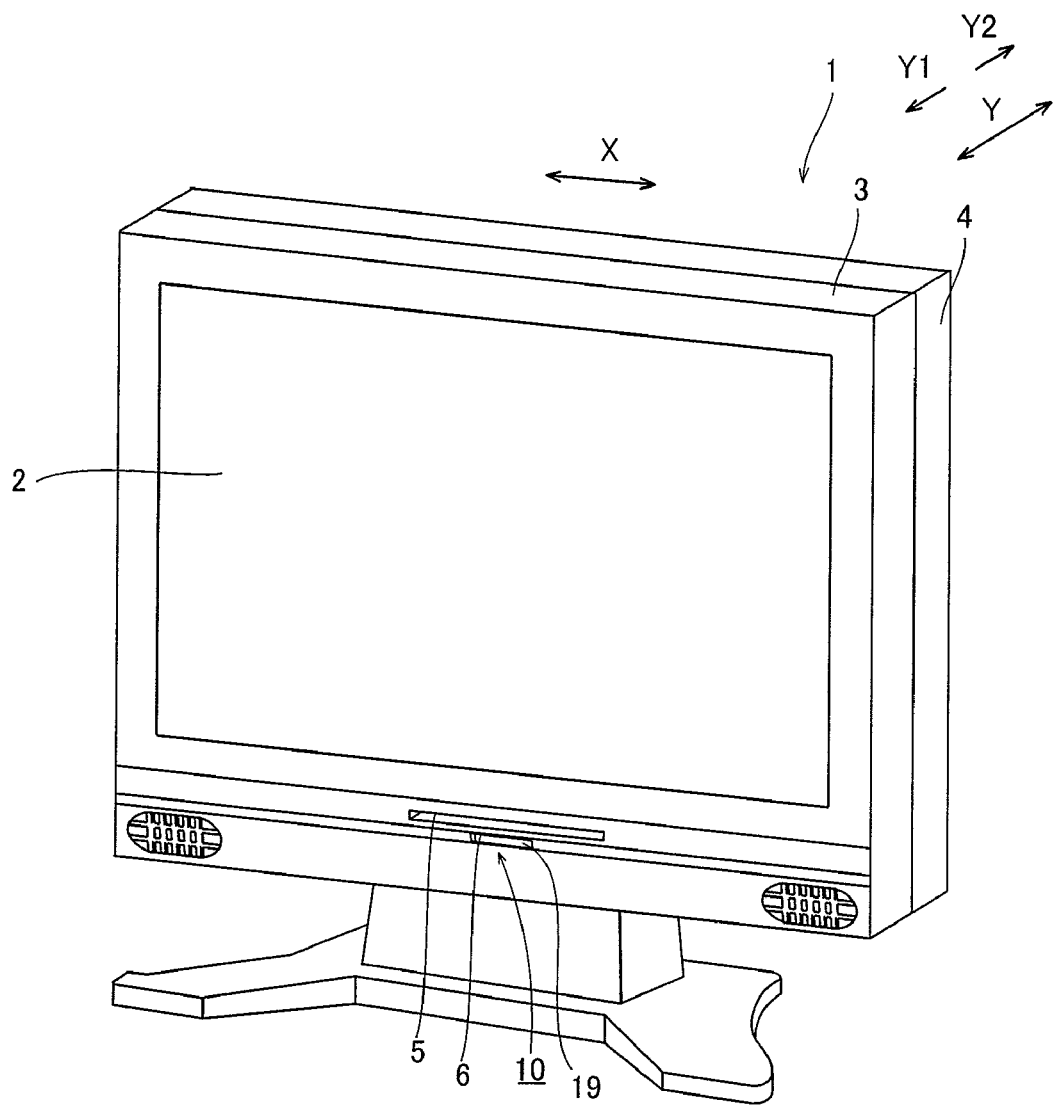
FIG. 1 is a perspective view showing the overall structure of a television set with a disk unit comprising an indicator unit according to an embodiment of the present invention.
Figure 2:
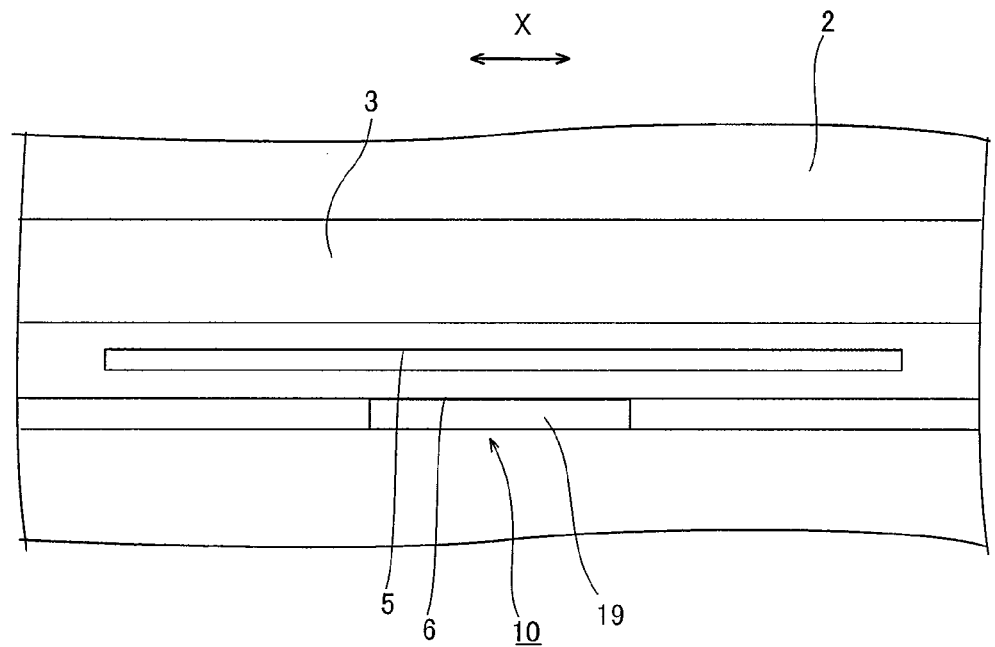
FIG. 2 is an enlarged front elevational view showing the structure of a portion around the indicator unit of the television set with a disk unit according to the embodiment of the present invention.

The television set 1 with a disk unit according to the embodiment of the present invention comprises a liquid crystal panel 2 for displaying images, as shown in FIG. 1. The liquid crystal panel 2 is supported by a front housing 3 and a rear housing 4. The front housing 3 has a disk slot 5 provided under the liquid crystal panel 2 for receiving a disk and a display portion slot 6 provided under the disk slot 5 for receiving a display portion 19 of the indicator unit 10 described later, as shown in FIGS. 1 and 2.

Figure 3:
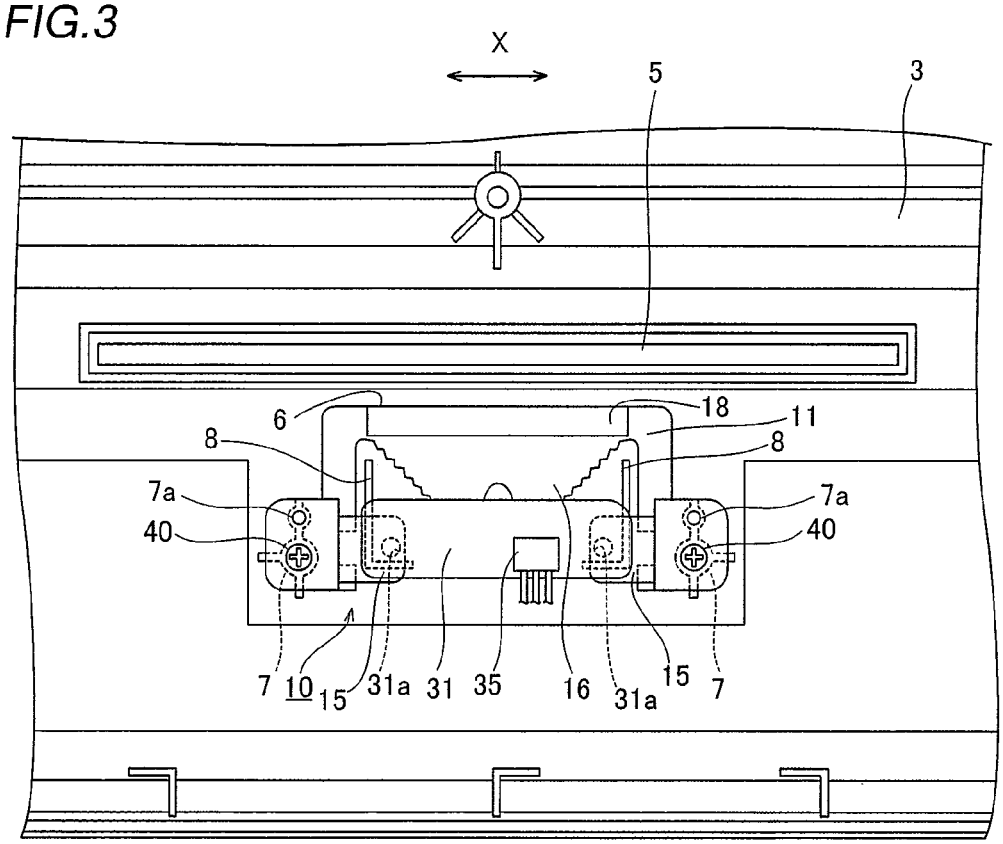
FIG. 3 is a rear elevational view of a front housing and the indicator unit of the television set with a disk unit according to the embodiment shown in FIG. 1.

As shown in FIG. 3, the indicator unit 10 for displaying light from a light-emitting diode (hereinafter referred to as an LED) 32 (see FIG. 8) described later is provided on the rear surface of the front housing 3. This indicator unit 10 includes a lens 11 of translucent resin having the display portion 19 (see FIG. 2) inserted into the display portion slot 6, the LED 32 and a wiring board 31 mounted with the LED 32 (see FIG. 8). The lens 11 is an example of the "lens member" in the present invention.

Figure 4:
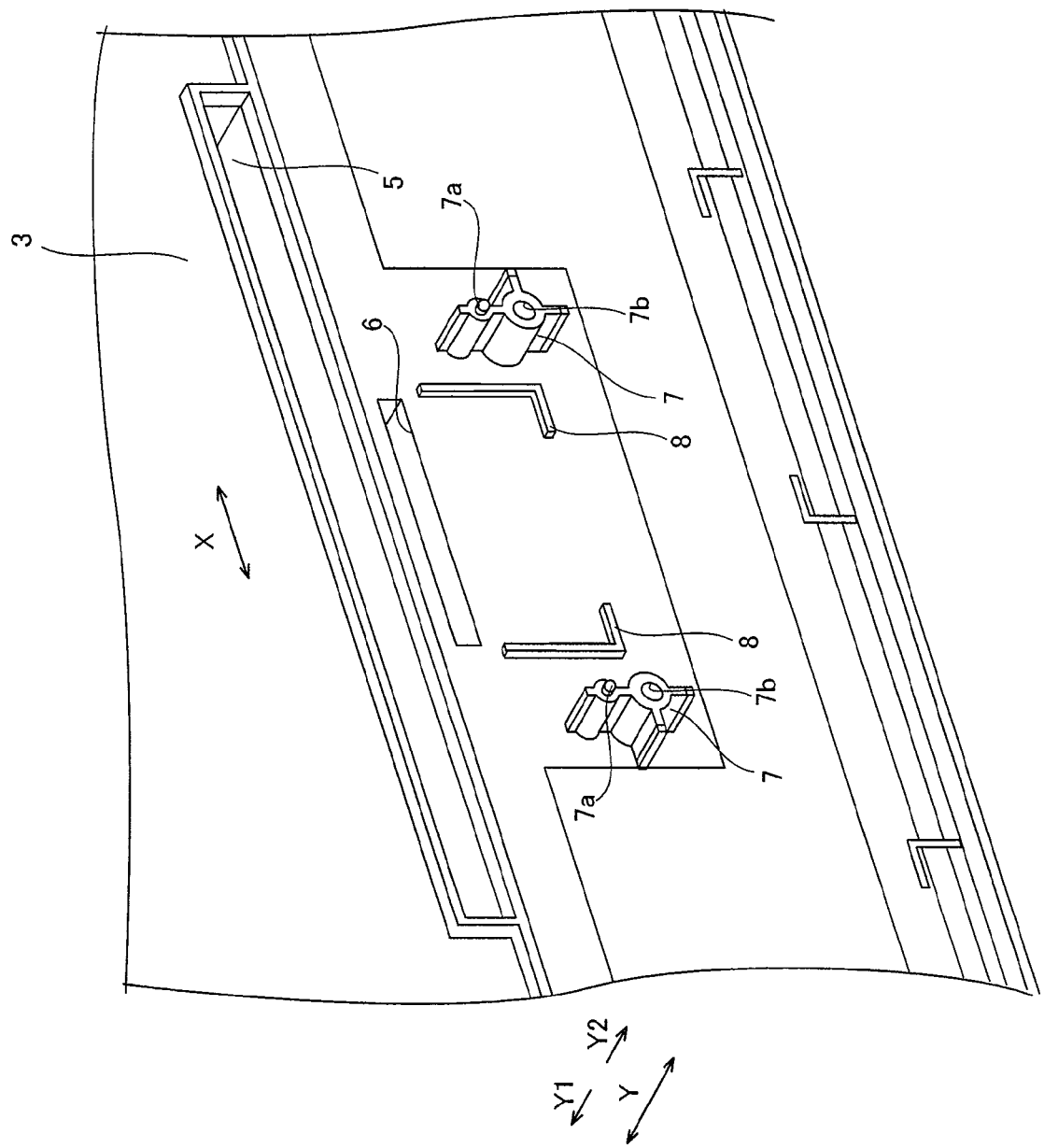
FIG. 4 is a perspective view showing the structure of the rear surface of the front housing according to the embodiment shown in FIG. 3.

As shown in FIGS. 3 and 4, a pair of housing-side mounting portions 7 for mounting the lens 11 (see FIG. 3) on the front housing 3 are provided on the rear surface of the front housing 3 at a prescribed interval in a direction X. Bosses 7a for regulating the position of the lens 11 (see FIG. 3) are provided on upper portions of the pair of housing-side mounting portions 7, as shown in FIG. 4. Threaded holes 7b for mounting the lens 11 (see FIG. 3) are provided on lower portions of the pair of housing-side mounting portions 7. A pair of L-shaped ribs 8 are further formed on the rear surface of the front housing 3 for coming into contact with the wiring board 31 (see FIG. 3) and pressing the same along arrow Y2, as shown in FIGS. 3 and 4.

Figure 5:
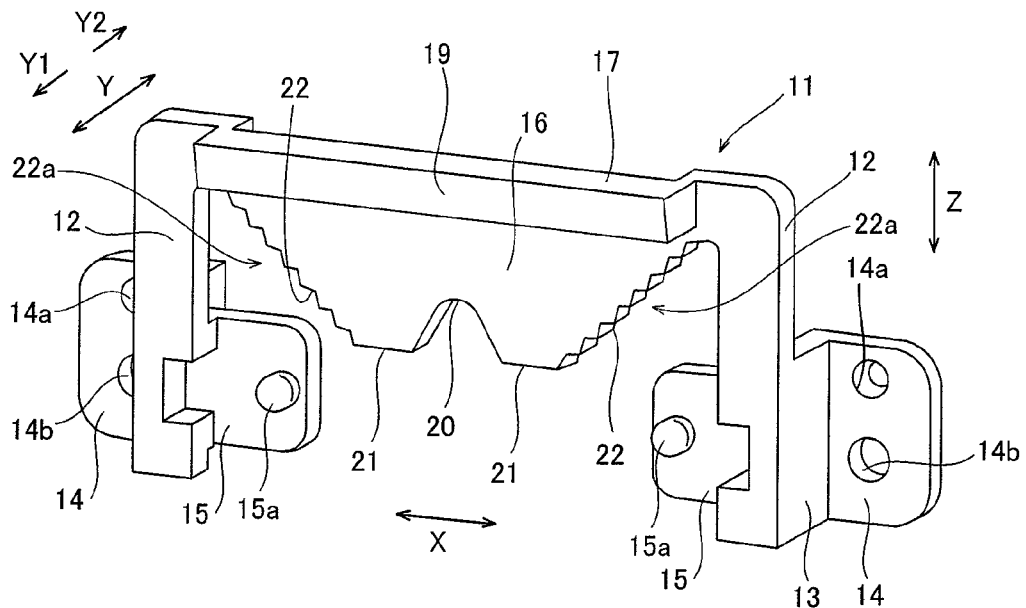
FIG. 5 is a perspective view showing the structure of a lens of the indicator unit according to the embodiment shown in FIG. 3.
Figure 6:
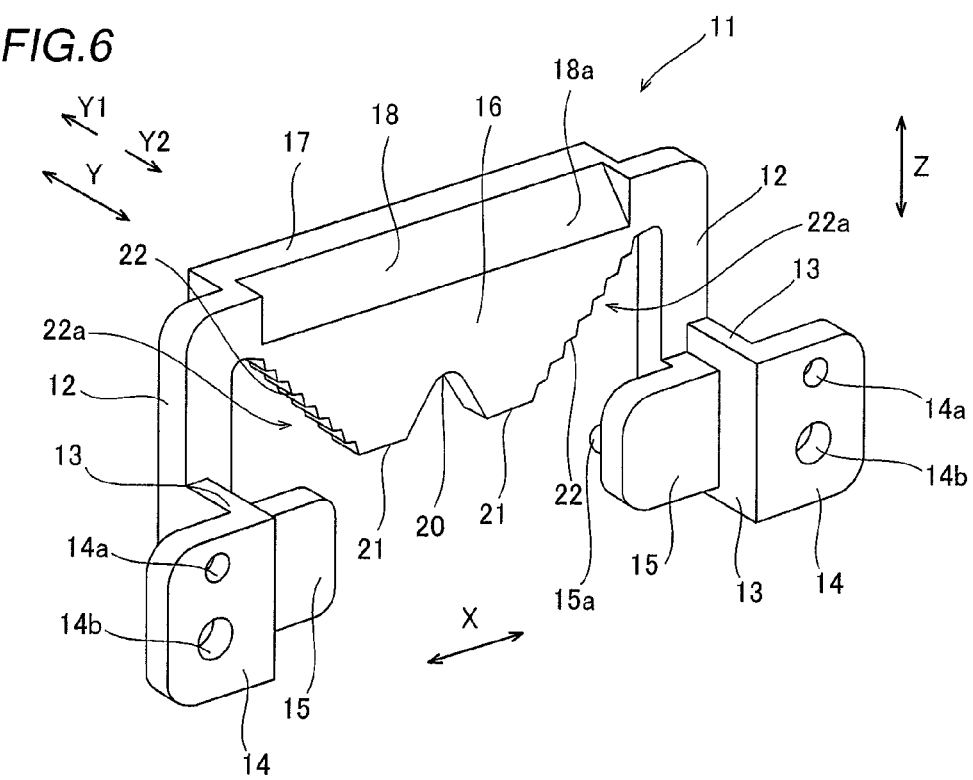
FIG. 6 is a perspective view showing the structure of the lens of the indicator unit according to the embodiment shown in FIG. 3.
Figure 7:
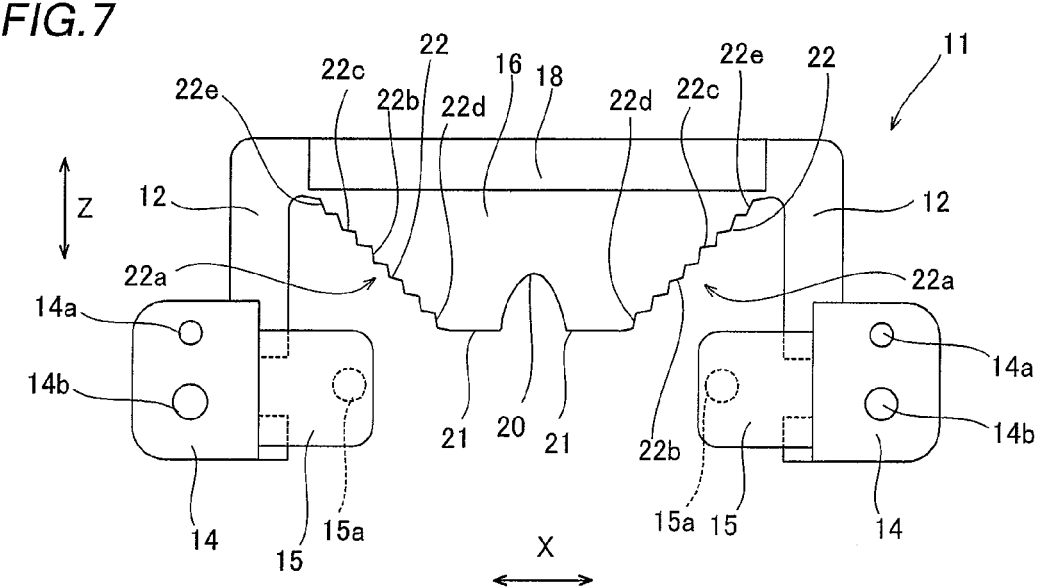
FIG. 7 is a rear elevational view showing the structure of the lens of the indicator unit according to the embodiment shown in FIG. 3.

According to this embodiment, the lens 11 has a pair of legs 12 provided on both outer sides in the width direction (direction X), as shown in FIGS. 5 to 7. The lens 11 also has protrusions 13 so formed as to protrude from the pair of legs 12 rearward (along arrow Y2) in the anteroposterior direction (direction Y) and lens-side mounting portions 14 so formed as to protrude from ends of the protrusions 13 outward in the width direction (direction X), as shown in FIGS. 5 and 6. The pair of lens-side mounting portions 14 are provided for mounting the lens 11 on the housing-side mounting portions 7 of the front housing 3 (see FIG. 3). Boss receiving holes 14a receiving the bosses 7a of the housing-side mounting portions 7 are provided on upper portions of the lens-side mounting portions 14, while screw receiving holes 14b are provided on lower portions of the lens-side mounting portions 14 on positions corresponding to the threaded holes 7b of the housing-side mounting portions 7. The pair of protrusions 13 are provided with board support portions 15 so formed as to protrude from between the legs 12 and the lens-side mounting portions 14 inward in the width direction (direction X) respectively, as shown in FIGS. 5 and 6. The pair of board support portions 15 are provided for mounting the wiring board 31 (see FIG. 3). The board support portions 15 have bosses 15a so provided as to protrude toward the front surface (along arrow Y1) of the front housing 3 (see FIG. 3) for temporarily fixing the wiring board 31 (see FIG. 3), as shown in FIG. 6.

According to this embodiment, a light guide portion formed by a W-shaped vertical light guide portion 16 and a horizontal light guide portion 17 is provided between the pair of legs 12 of the lens 11, as shown in FIG. 6. A frontward reflecting portion 18 for reflecting light emitted from the LED 32 (see FIG. 8) and received from below frontward (along arrow Y1) in the anteroposterior direction (direction Y) is provided on the junction between the vertical light guide portion 16 and the horizontal light guide portion 17. The frontward reflecting portion 18 is constituted of an inclined surface 18a obliquely inclined by 45° frontward (along arrow Y1). The vertical light guide portion 16 is an example of the "first portion" in the present invention, and the horizontal light guide portion 17 is an example of the "second portion" in the present invention. The frontward reflecting portion 18 is an example of the "second reflecting portion" in the present invention, and the inclined surface 18a is an example of the "first inclined portion" in the present invention. As shown in FIG. 5, the display portion 19 for displaying the light from the LED 32 (see FIG. 8) is provided on the front end of the horizontal light guide portion 17. The front end surface of the display portion 19 has a fine corrugated shape.

According to this embodiment, an LED arrangement portion 20 for arranging the LED 32 (see FIG. 8) is provided on a recessed portion at the center of the W-shaped vertical light guide portion 16, as shown in FIGS. 5 to 7. The vertical light guide portion 16 has a pair of flat portions 21 so formed as to extend from the LED arrangement portion 20 toward both width-directional outer sides. Further, the vertical light guide portion 16 is provided with a pair of upward reflecting portions 22 having inclined portions 22a so formed as to obliquely outwardly extend upward from the pair of flat portions 21 up to portions around ends of the frontward reflecting portion 18. The upward reflecting portions 22 are provided for reflecting the light from the LED 32 (see FIG. 8) upward. The inclined portions 22a of the upward reflecting portions 22 have stepped shapes formed by step portions 22b obliquely outwardly extending upward to some extent (at an angle of several degrees) with respect to the vertical direction and step portions 22c obliquely outwardly extending upward to some extent (at an angle of several degrees) with respect to the horizontal direction, as shown in FIG. 7. More specifically, the inclined portions 22a have stairlike shapes obtained by alternately forming the step portions 22b extending along the upward direction and the step portions 22c extending along the width direction. Further, the step portions provided between the innermost step portions 22d (closer to the flat portions 21) and the outermost step portions 22e (closer to the legs 12) are so formed as to have the same shape. Thus, the display portion 19 displays the light reflected by the upward reflecting portions 22 as light spots by the number of the step portions 22b. The LED arrangement portion 20 is an example of the "light source arrangement portion" in the present invention, the upward reflecting portions 22 are examples of the "first reflecting portion" in the present invention, and the inclined portions 22a are examples of the "second inclined portion" in the present invention. The step portions 22b are examples of the "first step portion" in the present invention, and the step portions 22c are examples of the "second step portion" in the present invention.

Figure 8:
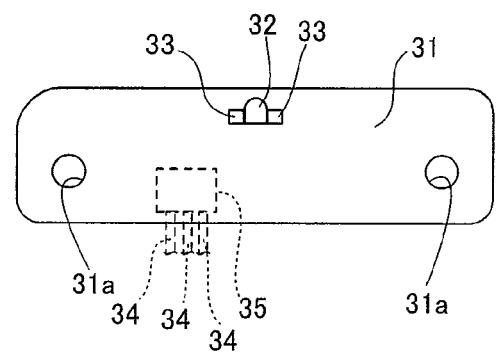
FIG. 8 is a front elevational view showing the structure of a board portion of the indicator unit according to the embodiment shown in FIG. 3.
Figure 9:
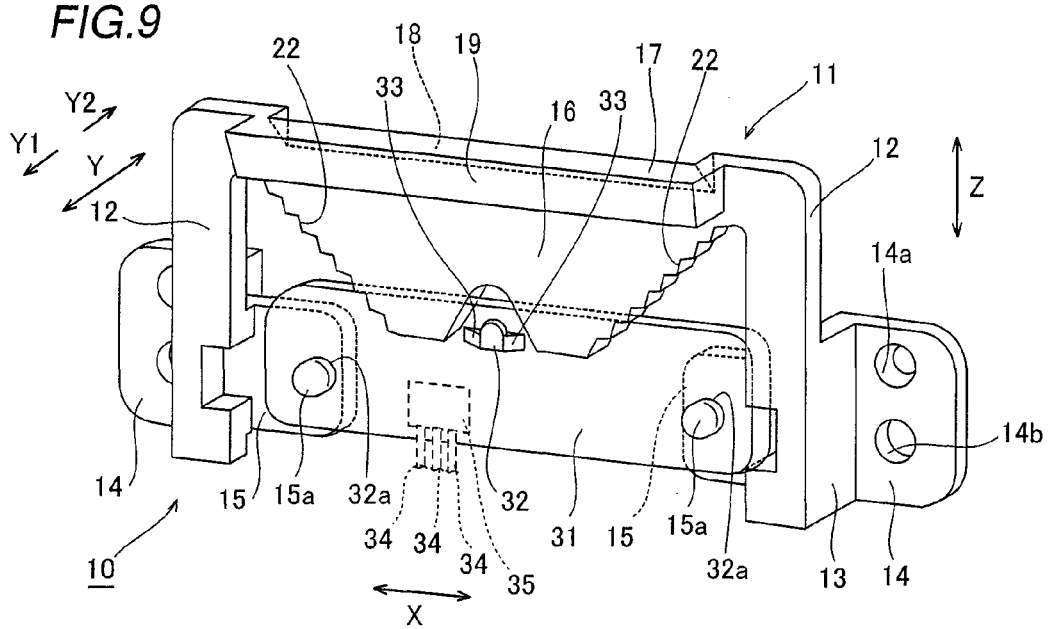
FIG. 9 is a perspective view showing the structure of the indicator unit according to the embodiment shown in FIG. 3.
Figure 10:
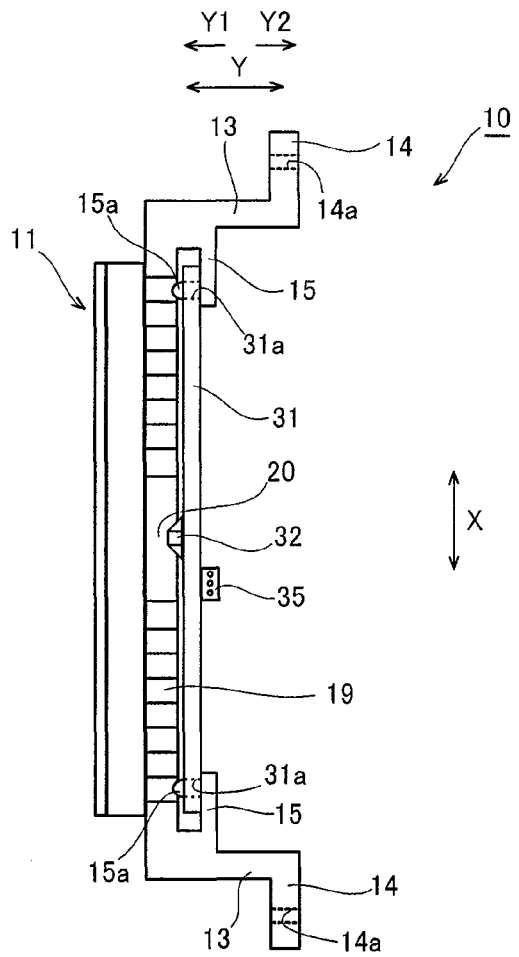
FIG. 10 is a bottom plan view showing the structure of the indicator unit according to the embodiment shown in FIG. 3.
Figure 11:
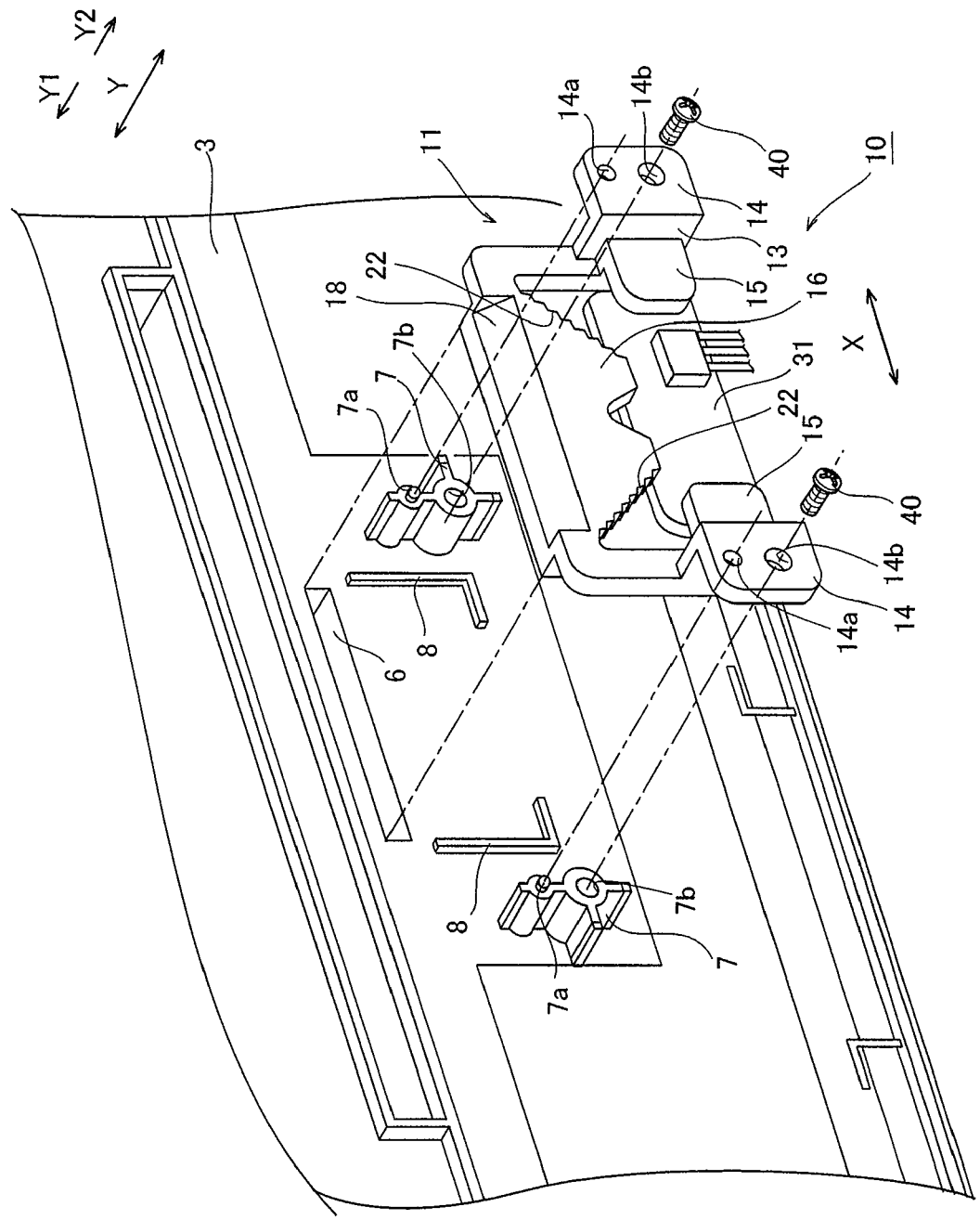
FIG. 11 is an exploded perspective view showing a method of assembling the front housing and the indicator unit of the television set with a disk unit according to the embodiment shown in FIG. 1.

As shown in FIGS. 8 and 9, the LED 32 is mounted on a substantially central portion of the front side (in the depth direction (along arrow Y1 in FIG. 9)) of the wiring board 31, to protrude from the front surface of the wiring board 31 frontward. The LED 32 is an example of the "light source portion" in the present invention. A pair of solder portions 33 are provided for electrically connecting the LED 32 to the wiring board 31. As shown in FIGS. 8 and 9, lead wires 34 and a socket 35 are mounted on the rear surface (along arrow Y2 in FIG. 9) of the wiring board 31, for supplying power to the LED 32. As shown in FIGS. 8 to 10, boss receiving holes 31a receiving the bosses 15a (see FIGS. 9 and 10) of the board support portions 15 (see FIGS. 9 and 10) of the lens 11 are provided around both ends of the wiring board 31.

The wiring board 31 is so arranged that the LED 32 overlaps the frontward reflecting portion 18 and the vertical light guide portion 16 of the lens 11 in the anteroposterior direction, as shown in FIG. 10. Further, the wiring board 31 is so arranged that the LED 32 overlaps the flat portions 21 located on the lower end of the vertical light guide portion 16 of the lens 11 in the vertical direction, as shown in FIG. 9.

The procedure for mounting the indicator unit 10 on the front housing 3 of the television set 1 with a disk unit according to the embodiment of the present invention is now described with reference to FIGS. 3 and 9 to 11.

First, the pair of bosses 15a of the pair of board support portions 15 of the lens 11 are inserted into the pair of boss receiving holes 31a of the wiring board 31 respectively thereby temporarily fixing the wiring board 31 to the lens 11, as shown in FIGS. 9 and 10. More specifically, the wiring board 31 is arranged on the front side (along arrow Y1) of the board support portions 15 of the lens 11 and on the rear side (along arrow Y2) of the W-shaped vertical light guide portion 16 when mounted on the lens 11, as shown in FIG. 10. In other words, the wiring board 31 is arranged between the board support portions 15 and the vertical light guide portion 16 in plan view, while the boss receiving holes 31a thereof receive the bosses 15a of the board support portions 15. Thus, the vertical light guide portion 16 inhibits the wiring board 31 from moving in a direction to disengage from the bosses 15a of the board support portions 15, whereby the wiring board 31 is temporarily fixed to the lens 11. The wiring board 31 is positioned with respect to the lens 11 by receiving the bosses 15a of the board support portions 15 in the boss receiving holes 31a thereof, whereby the LED 32 is arranged at the center of the LED arrangement portion 20 provided at the center of the W-shaped vertical light guide portion 16 of the lens 11, as shown in FIG. 10.

Then, the display portion 19 of the lens 11 is inserted into the display portion slot 6 of the front housing 3, while the bosses 7a of the pair of housing-side mounting portions 7 of the front housing 3 are inserted into the boss receiving holes 14a of the pair of lens-side mounting portions 14 of the lens 11 respectively at the same time. Thus, the lens 11 and the wiring board 31 are positioned with respect to the front housing 3. At this time, the pair of L-shaped ribs 8 of the front housing 3 come into contact with portions along both sides of the front surface of the wiring board 31 and portions around side edges of the lower end thereof, as shown in FIG. 3. Thus, the ribs 8 press the wiring board 31 rearward (along arrow Y2 in FIG. 11). Then, screw members 40 are inserted into the screw receiving holes 14b of the pair of lens-side mounting portions 14 of the lens 11, and clamped to the pair of threaded holes 7b of the front housing 3. Thus, the indicator unit 10 is mounted on the front housing 3 while the wiring board 31 can be fixed by holding the same between the ribs 8 of the front housing 3 and the board support portions 15 of the lens 11, whereby no screws or the like may be required for mounting the wiring board 31. The indicator unit 10 is mounted on the front housing 3 in the aforementioned manner.

The paths of the light emitted from the LED 32 of the indicator unit 10 of the television set 1 with a disk unit and the light spots displayed on the display portion 19 are now described with reference to FIGS. 12 to 14.

Figure 12:
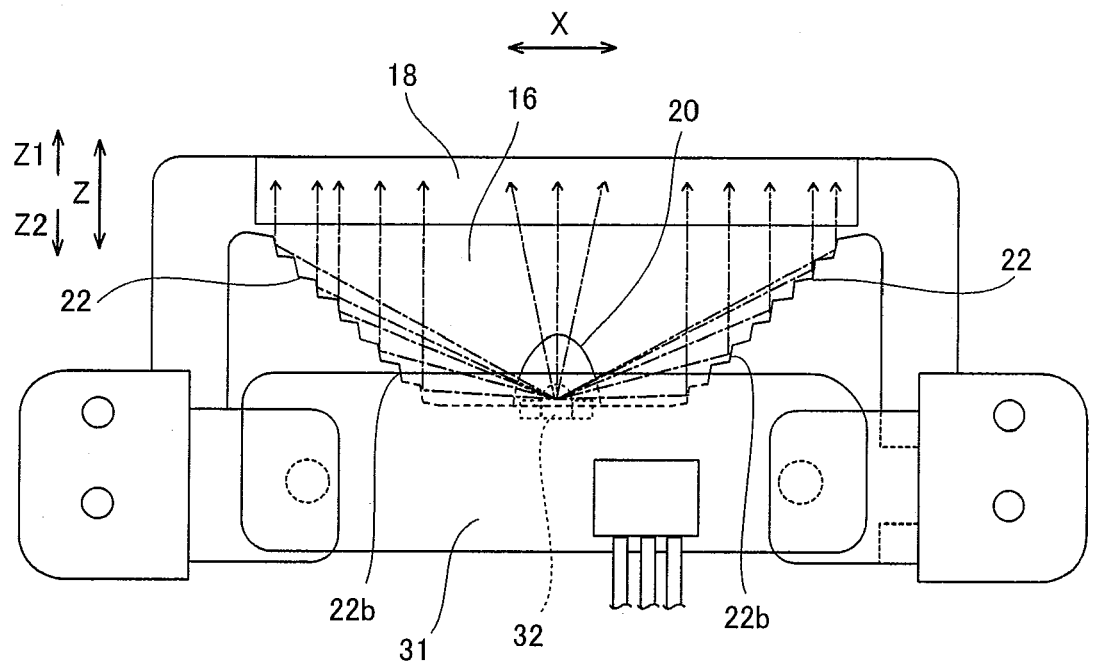
FIG. 12 is a rear elevational view for illustrating the paths of light emitted from a light-emitting diode of the indicator unit according to the embodiment shown in FIG. 3.

The LED 32 radially emits the light from a light emitting portion (not shown), whereby upward light components (along arrow Z1) progress toward the frontward reflecting portion 18, as shown in FIG. 12. On the other hand, light components emitted toward the width direction (direction X) progress toward the stepped upward reflecting portions 22. The light components reaching the upward reflecting portions 22 are reflected upward by the step portions 22b, to progress toward the frontward reflecting portion 18.

Figure 13:
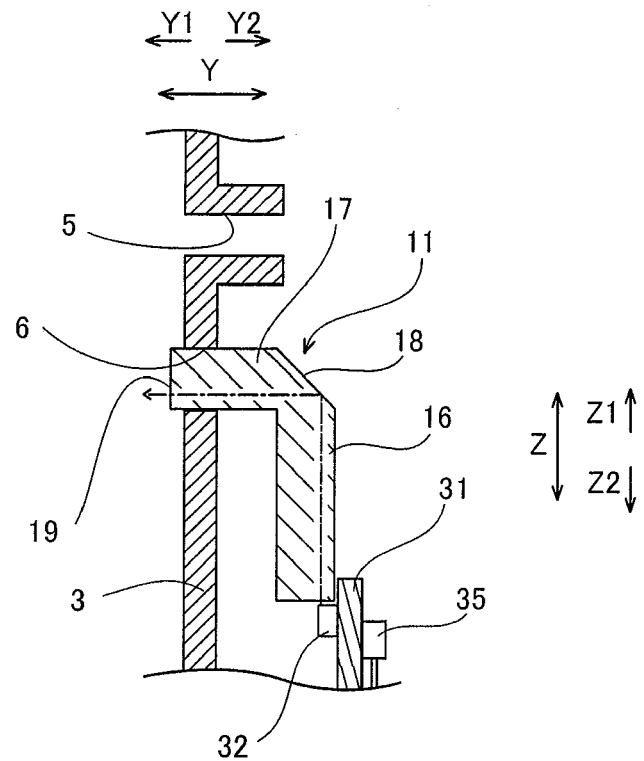
FIG. 13 is a side sectional view for illustrating the paths of the light emitted from the light-emitting diode of the indicator unit according to the embodiment shown in FIG. 3.
Figure 14:
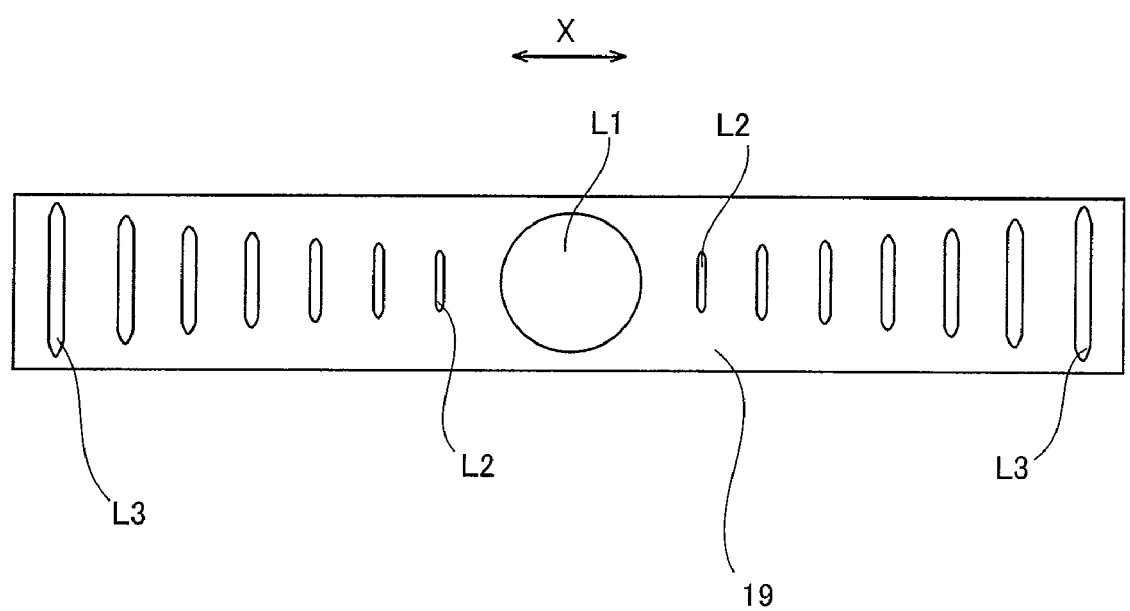
FIG. 14 is a front elevational view showing light spots displayed on a display portion of the indicator unit according to the embodiment shown in FIG. 1.

As shown in FIG. 13, the light components emitted from the LED 32 upward (along arrow Z1) and those reflected by the step portions 22b (see FIG. 12) of the upward reflecting portions 22 (see FIG. 12) and directed upward are transmitted through the vertical light guide portion 16, to progress frontward (along arrow Y1) through the frontward reflecting portion 18. The light components progressing frontward (along arrow Y1) through the frontward reflecting portion 18 are transmitted through the horizontal light guide portion 17 as shown in FIG. 13, to form light spots L1 to L3 displayed on the display portion 19, as shown in FIG. 14. These light spots L1 to L3 reflect the W shape of the vertical light guide portion 16 of the lens 11. More specifically, the central light spot L1 is formed by a light component progressing from the LED arrangement portion 20 directly toward the frontward reflecting portion 18 with no reflection by the upward reflecting portions 22. The remaining light spots, i.e., the light spots L2 adjacent to the central light spot L1 up to the endmost light spots L3 are formed by light components reflected by the step portions 22b (see FIG. 7) of the upward reflecting portions 22. The light spots L2 are formed by light components reflected by the step portions 22d (FIG. 7) closest to the center. The endmost light spots L3 displayed on the display portion 19 are formed by light components reflected by the outermost step portions 22e (see FIG. 7). The display portion 19 displays the remaining light spots, formed by light components reflected by the step portions located between the step portions 22d and 22e (see FIG. 7), from the center toward both sides at prescribed intervals in the direction X. Thus, the display portion 19 can display the light spots L1 to L3 reflecting the W shape of the vertical light guide portion 16 of the lens 11.

According to this embodiment, as hereinabove described, the indicator unit 10 comprises the lens 11 including the upward reflecting portions 22 reflecting the light upward (along arrow Z), the frontward reflecting portion 18 reflecting the light frontward (along arrow Y1) and the display portion 19 displaying the light reflected by the frontward reflecting portion 18 so that the light from the LED 32 is reflected by the upward reflecting portions 22 to progress upward (along arrow Z1), thereafter reflected by the frontward reflecting portion 18 to progress frontward (along arrow Y1) and displayed on the display portion 19, whereby the light emitted from the LED 32 progresses from the LED 32 up to the display portion 19 by the total distance in the upward direction (along arrow Z1) and the front direction (along arrow Y1). Thus, the light emitted from the LED 32 is enlarged before reaching the display portion 19, whereby regions of the display portion 19 irradiated with the light from the LED 32 can be enlarged. Further, the LED 32 is so arranged that the position thereof in the anteroposterior direction (direction Y) overlaps the frontward reflecting portion 18 while the light from the LED 32 is reflected by the frontward reflecting portion 18 in the front direction (along arrow Y1) and displayed on the display portion 19 so that the depth-directional length of the indicator unit 10 can be reduced due to the overlap of the LED 32 and the frontward reflecting portion 18 of the lens 11 in the anteroposterior direction (direction Y), whereby the depth-directional length (along the direction Y) of the indicator unit 10 can be inhibited from increase. Consequently, the depth of the indicator unit 10 can be inhibited from increase while enlarging the regions of the display portion 19 irradiated with the light from the LED 32.

According to this embodiment, as hereinabove described, the lens 11 includes the vertical light guide portion 16 extending downward (along arrow Z2) and the horizontal light guide portion 17 extending in the depth direction (direction Y) and having the display portion 19 on the front end surface while the frontward reflecting portion 18 is constituted of the inclined surface 18a provided on the outer surface around the boundary between the vertical light guide portion 16 and the horizontal light guide portion 17 so that the frontward reflecting portion 18 is provided on the rear end of the horizontal light guide portion 17 with respect to the display portion 19 provided on the front end surface of the horizontal light guide portion 17 and the light from the LED 32 reflected by the frontward reflecting portion 18 is transmitted substantially through the overall length of the horizontal light guide portion 17 in the depth direction (direction Y) to progress, whereby the regions irradiated with the light displayed on the display portion 19 can be efficiently enlarged.

According to this embodiment, as hereinabove described, the vertical light guide portion 16 of the lens 11 is W-shaped in front elevational view, the LED arrangement portion 20 for arranging the LED 32 is provided on the recessed portion at the center of the vertical light guide portion 16 in the width direction (direction X), and the upward reflecting portions 22 having the inclined portions 22a obliquely outwardly extending from the outer ends of the flat portions 21 formed toward the outer sides of the LED arrangement portion 20 and reflecting the light from the LED arrangement portion 20 upward (along arrow Z1) are provided on the outer side surfaces in the width direction (direction X), whereby the light from the LED 32 is reflected upward with a prescribed spread by the obliquely outwardly extending inclined portions 22a of the upward reflecting portions 22 when reflected by the upward reflecting portions 22. Thus, the regions irradiated with the light can be enlarged by the light reflected not only by the frontward reflecting portion 18 but also by the upward reflecting portions 22, whereby the regions irradiated with the light displayed on the display portion 19 can be more efficiently enlarged.

According to this embodiment, as hereinabove described, the single LED 32 is arranged on the LED arrangement portion 20 at the center of the vertical light guide portion 16 in the width direction (direction X) and the inclined portions 22a of the upward reflecting portions 22 are provided on both outer side surfaces of the W-shaped vertical light guide portion 16 to hold the single LED 32 therebetween so that the light can be reflected upward (along arrow Z1) at a prescribed spreading angle by the two upward reflecting portions 22 with the single LED 22, whereby the regions irradiated with the light displayed on the display portion 19 can be more effectively enlarged also when the single LED 32 is employed.

According to this embodiment, as hereinabove described, the inclined portions 22a of the upward reflecting portions 22 of the lens 11 have the stepped shapes formed by the step portions 22b extending in the direction outwardly inclined to some extend with respect to the vertical direction and the step portions 22c obliquely outwardly extending upward to some extent with respect to the horizontal direction so that the light displayed on the display portion 19 reflects the stepped shapes of the inclined portions 22a of the upward reflecting portions 22, whereby the light from the LED 32 is reflected by the respective ones of the plurality of step portions 22b provided on the upward reflecting portions 22. Thus, the display portion 19 can display the light spots by the number of the step portions 22b, extending in the vertical direction (direction Z), of the upward reflecting portions 22.

According to this embodiment, as hereinabove described, the surface of the display portion 19 of the lens 11 has the fine corrugated shape in order to disperse the light reflected by the frontward reflecting portion 18 when the same is transmitted through the display portion 19 so that the light reflected by the frontward reflecting portion 18 is dispersed when transmitted through the display portion 19, whereby the regions irradiated with the light displayed on the display portion 19 can be further enlarged.

According to this embodiment, as hereinabove described, the lens 11 is rendered translucent with respect to the light from the LED 32, whereby the light from the LED 32 can be easily transmitted through the lens 11. Further, the lens 11 is so made of the resin that the same can be easily formed by resin molding also into a complicated shape.

According to this embodiment, as hereinabove described, the vertical light guide portion 16 of the lens 11 including the upward reflecting portions 22 and the horizontal light guide portion 17 including the frontward reflecting portion 18 and the display portion 19 are so integrally formed that the number of components can be reduced as compared with a case of providing the vertical light guide portion 16 and the horizontal light guide portion 17 of the lens 11 separately from each other.

According to this embodiment, as hereinabove described, the LED 32 is so mounted as to protrude from the wiring board 31 frontward and arranged to overlap the vertical light guide portion 16 of the lens 11 in the anteroposterior direction so that the LED 32 and the vertical light guide portion 16 of the lens 11 can be easily arranged to overlap each other in the anteroposterior direction, whereby the depth-directional length of the indicator unit 10 can be further inhibited from increase due to the anteroposterior overlap of the LED 32 and the vertical light guide portion 17 of the lens 11.

According to this embodiment, as hereinabove described, the LED 32 is so arranged on the LED arrangement portion 20 as to vertically overlap the vertical light guide portion 17 of the lens 11, whereby the upward reflecting portions 22 can upwardly reflect the light emitted from the LED 32 in the width direction. Thus, the light emitted from the LED 32 can be efficiently directed toward the display portion 19.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the television set 1 with a disk unit employed as the exemplary television set comprising the indicator unit, the present invention is not restricted to this but is also applicable to an image display, a recording/reproducing apparatus, a stereo or a PC (personal computer), so far as the indicator unit can be arranged thereon.

While the lens 11 of the indicator unit 10 is made of translucent resin in the aforementioned embodiment, the present invention is not restricted to this but the lens 11 may alternatively be made of translucent glass or the like other than the resin.

What is claimed is:

1. An indicator unit comprising:
a light source portion consisting of a light-emitting element; and
a lens member including a first reflecting portion reflecting light received from said light source portion in a prescribed direction, a second reflecting portion reflecting said light reflected by said first reflecting portion and light directly received from said light source portion in a front direction intersecting with said prescribed direction, and a display portion displaying said light reflected by said second reflecting portion in said front direction, wherein
said light source portion is so arranged that the anteroposterior position thereof overlaps at least said second reflecting portion,
said first reflecting portion of said lens member has a stepped shape,
said second reflecting portion of said lens member has a flat surface shape,
a first light spot displayed on said display portion is formed by a first light component reflected by a segment of said stepped shape of said first reflecting portion,
a second light spot displayed on said display portion is formed by a second light component directly received from said light source portion by said flat surface shape and reflected by said flat surface shape to reflect a shape of said light source portion, and
said lens member further includes a recessed portion in which at least a portion of the light source portion is arranged.

2. The indicator unit according to claim 1, wherein
said lens member further includes a first portion, including said first reflecting portion, extending in said prescribed direction and a second portion extending from said first portion in said front direction and including said display portion on the front end surface thereof, and
said second reflecting portion is constituted of a first inclined portion provided on an outer surface around the boundary between said first portion and said second portion.

3. The indicator unit according to claim 2, wherein
said first portion of said lens member is W-shaped in front elevational view,
a light source arrangement portion for arranging said light source portion is provided on the recessed portion at the width-directional center of said W-shaped first portion, and
a second inclined portion constituting said first reflecting portion reflecting light from said light source arrangement portion in said prescribed direction and extending obliquely outward is provided on the outer side surface of said W-shaped first portion.

4. The indicator unit according to claim 3, wherein
said light-emitting element is constituted of a single light-emitting diode arranged on said light source arrangement portion at the width-directional center of said W-shaped first portion, and
said second inclined portions constituting said first reflecting portion are provided on both outer side surfaces of said W-shaped first portion to hold said single light-emitting diode therebetween.

5. The indicator unit according to claim 1, wherein
said light is so displayed on said display portion as to reflect said stepped shape.

6. The indicator unit according to claim 1, wherein
said lens member is made of translucent resin.

7. The indicator unit according to claim 1, wherein
said lens member further includes a first portion, including said first reflecting portion, extending in said prescribed direction and a second portion extending from said first portion in said front direction and having said display portion on the front end surface thereof, and said first portion and said second portion of said lens member are integrally formed.

8. The indicator unit according to claim 2, further comprising a wiring board mounted with said light source portion, wherein
said light source portion is so mounted as to protrude from said wiring board frontward, and so arranged as to at least partially overlap said first portion of said lens member in the anteroposterior direction.

9. The indicator unit according to claim 3, wherein
said light source portion is so arranged on said light source arrangement portion as to vertically overlap said first portion of said lens member.

10. The indicator unit according to claim 5, wherein
said first reflecting portion of said lens member includes a first step portion extending along said prescribed direction and a second step portion extending along the width direction, and has a stairlike shape obtained by alternately forming said first step portion and said second step portion.

11. A television set integrally comprising a disk unit including an indicator unit, wherein said indicator unit includes:
a light source portion consisting of a light-emitting element; and
a lens member including a first reflecting portion reflecting light received from said light source portion in a prescribed direction, a second reflecting portion reflecting said light reflected by said first reflecting portion and light directly received from said light source portion in a front direction intersecting with said prescribed direction, and a display portion displaying said light reflected by said second reflecting portion in said front direction, wherein
said light source portion is so arranged that the anteroposterior position thereof overlaps at least said second reflecting portion,
said first reflecting portion of said lens member has a stepped shape,
said second reflecting portion of said lens member has a flat surface shape,
a first light spot displayed on said display portion is formed by a first light component reflected by a segment of said stepped shape of said first reflecting portion,
a second light spot displayed on said display portion is formed by a second light component directly received from said light source portion by said flat surface shape and reflected by said flat surface shape to reflect a shape of said light source portion, and
said lens member further includes a recessed portion in which at least a portion of the light source portion is arranged.

12. The television set according to claim 11, wherein
said lens member further includes a first portion, including said first reflecting portion, extending in said prescribed direction and a second portion extending from said first portion in said front direction and including said display portion on the front end surface thereof, and said second reflecting portion is constituted of a first inclined portion provided on an outer surface around the boundary between said first portion and said second portion.

13. The television set according to claim 11, wherein
said first portion of said lens member is W-shaped in front elevational view,
a light source arrangement portion for arranging said light source portion is provided on the recessed portion at the width-directional center of said W-shaped first portion, and
a second inclined portion constituting said first reflecting portion reflecting light from said light source arrangement portion in said prescribed direction and extending obliquely outward is provided on the outer side surface of said W-shaped first portion.

14. The television set according to claim 13, wherein
said light-emitting element is constituted of a single light-emitting diode arranged on said light source arrangement portion at the width-directional center of said W-shaped first portion, and
said second inclined portions constituting said first reflecting portion are provided on both outer side surfaces of said W-shaped first portion to hold said single light-emitting diode therebetween.

15. The television set according to claim 11, wherein
said light is so displayed on said display portion as to reflect said stepped shape.

16. The television set according to claim 11, wherein
said lens member is made of translucent resin.

17. The television set according to claim 11, wherein
said lens member further includes a first portion, including said first reflecting portion, extending in said prescribed direction and a second portion extending from said first portion in said front direction and having said display portion on the front end surface thereof, and
said first portion and said second portion of said lens member are integrally formed.

18. The television set according to claim 12, further comprising a wiring board mounted with said light source portion, wherein
said light source portion is so mounted as to protrude from said wiring board frontward, and so arranged as to at least partially overlap said first portion of said lens member in the anteroposterior direction.

19. The television set according to claim 13, wherein
said light source portion is so arranged on said light source arrangement portion as to vertically overlap said first portion of said lens member.

20. The television set according to claim 15, wherein
said first reflecting portion of said lens member includes a first step portion extending along said prescribed direction and a second step portion extending along the width direction, and has a stairlike shape obtained by alternately forming said first step portion and said second step portion.

* * * * *